United States Patent
Matsumura et al.

(10) Patent No.: US 9,810,779 B2
(45) Date of Patent: Nov. 7, 2017

(54) RADAR MODULE AND SPEED MEASURING DEVICE USING SAME

(71) Applicant: Hitachi Automotive Systems, Ltd., Hitachinaka-shi, Ibaraki (JP)

(72) Inventors: Takafumi Matsumura, Hitachinaka (JP); Hideyuki Nagaishi, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 350 days.

(21) Appl. No.: 14/432,232

(22) PCT Filed: Oct. 4, 2013

(86) PCT No.: PCT/JP2013/077022
§ 371 (c)(1),
(2) Date: Mar. 30, 2015

(87) PCT Pub. No.: WO2014/054765
PCT Pub. Date: Apr. 10, 2014

(65) Prior Publication Data
US 2015/0253421 A1    Sep. 10, 2015

(30) Foreign Application Priority Data
Oct. 5, 2012    (JP) .................. 2012-222649

(51) Int. Cl.
*G01S 13/60*    (2006.01)
*G01S 7/03*    (2006.01)
(Continued)

(52) U.S. Cl.
CPC .............. *G01S 13/60* (2013.01); *G01S 7/032* (2013.01); *H01Q 1/3233* (2013.01);
(Continued)

(58) Field of Classification Search
CPC .... G01S 13/60; G01S 7/032; G01S 2007/028; G01S 2007/356; H01Q 1/3233; H01Q 19/062; H01Q 15/08
See application file for complete search history.

(56) References Cited

U.S. PATENT DOCUMENTS 4,755,820 A * 7/1988 Backhouse .......... H01Q 9/0407
343/700 MS
6,052,087 A    4/2000 Ishikawa et al.
(Continued)

FOREIGN PATENT DOCUMENTS

CN         201282193 Y      7/2009
DE    10 2006 009 012 A1   5/2007
(Continued)

OTHER PUBLICATIONS

International Search Report (PCT/ISA/210) dated Dec. 3, 2013 with English translation (five pages).
(Continued)

*Primary Examiner* — Matthew M Barker
(74) *Attorney, Agent, or Firm* — Crowell & Moring LLP (57) ABSTRACT

To provide a radar module used for a speed measuring device or the like, in which dispersion of intensity distribution of electromagnetic waves emitted from the radar module via a lens is small, the radar module using a substrate with a plane antenna formed on a surface of the substrate includes: a lens having one end face that is plane and another end face that is spherical. In the radar module, a plane side of the lens is disposed to contact the plane antenna, and a spherical side of the lens is disposed in a remote field of the plane antenna.

11 Claims, 9 Drawing Sheets

(51) Int. Cl.
*H01Q 1/32* (2006.01)
*H01Q 19/06* (2006.01)
*G01S 7/35* (2006.01)
*H01Q 15/08* (2006.01)
*G01S 7/02* (2006.01)

(52) U.S. Cl.
CPC ...... *H01Q 19/062* (2013.01); *G01S 2007/028* (2013.01); *G01S 2007/356* (2013.01); *H01Q 15/08* (2013.01)

(56) References Cited

U.S. PATENT DOCUMENTS

| | | | |
|---|---|---|---|
| 6,424,318 B1* | 7/2002 | Bergstedt | H01Q 15/08 29/600 |
| 7,667,667 B2* | 2/2010 | Kimura | H01Q 15/08 343/911 L |
| 2002/0149520 A1* | 10/2002 | Laubner | H01Q 1/40 343/700 MS |
| 2003/0201930 A1 | 10/2003 | Nagasaku et al. | |
| 2006/0139206 A1 | 6/2006 | Nagasaku et al. | |
| 2008/0091380 A1 | 4/2008 | Nagasaku et al. | |
| 2009/0243948 A1 | 10/2009 | Schmidt et al. | |

FOREIGN PATENT DOCUMENTS

| | | |
|---|---|---|
| EP | 1 677 126 A1 | 7/2006 |
| GB | 2 303 491 A | 2/1997 |
| JP | 9-8541 A | 1/1997 |
| JP | 10-341108 A | 12/1998 |
| JP | 2000-31727 A | 1/2000 |
| JP | 2003-315438 A | 11/2003 |
| JP | 2006-128834 A | 5/2006 |
| JP | 2006-184144 A | 7/2006 |
| JP | 4297027 B2 | 4/2009 |
| JP | 2012-21893 A | 2/2012 |
| JP | 2012-175680 A | 9/2012 |
| WO | WO 2011/118398 A1 | 9/2011 |

OTHER PUBLICATIONS

Japanese-language Written Opinion (PCT/ISA/237) dated Dec. 3, 2013 (five pages).
Chinese-language Office Action issued in counterpart Chinese Application No. 201380050270.7 dated Mar. 1, 2016 (Four (4) pages).
Supplementary European Search Report issued in counterpart European Application No. 13843095.4 dated May 10, 2016 (4 pages).
Godi, Gael et al., "Performance of Reduced Size Substrate Lens Antennas for Millimeter-Wave Communication", IEEE Transactions on Antennas and Propagation, vol. 53, No. 4, Apr. 2005, pp. 1278-1286, XP011129974.
Nagasaku, Toshiyuki et al., "77GHz Low-Cost Single-Chip Radar Sensor for Automotive Ground Speed Detection", Compound Semiconductor Integrated Circuits Symposium, 2008, IEEE, Oct. 12, 2008, pp. 1-4, XP031362375.

* cited by examiner

RADAR MODULE AND SPEED MEASURING DEVICE USING SAME

TECHNICAL FIELD

The present invention relates to a radar module used for a speed measuring device that calculates a speed by emitting an electromagnetic wave of, e.g., a millimeter wave band or a micro wave band toward a ground and measuring a frequency change quantity of a reflected wave for non-contact measurement of a groundspeed of a transport machine.

BACKGROUND ART

To detect a groundspeed of a transport machine such as an automobile or a railroad vehicle, a method for obtaining a speed by measurement of the number of rotations of wheels is generally known. Such a method is known to fail to measure a groundspeed at a time of wheel slip, and to cause a measurement error when a wheel diameter is changed due to deflation of a tire or wear of a wheel.

A speed measuring device is also known in which the device calculates a groundspeed by using a radar module of a millimeter wave band or a micro wave band, emitting a continuous electromagnetic wave from the radar module, receiving a reflected wave of the electromagnetic wave to measure a frequency change quantity of the reflected wave (see, e.g., Patent Literature 1). Since the device uses a non-contact type method, a groundspeed can be measured even at a time of slip and change of a wheel diameter causes no influence.

Such radar module using an electromagnetic wave generally has wide directivity of an antenna. Thus, the directivity has to be sharpened by a lens. For example, Patent Literature 2 proposes a radar module that seals an MMIC (monolithic microwave integrated circuit) chip that has an active circuit, e.g., an oscillator or a mixer and an antenna mounted on a same semiconductor substrate in a resin package, and mounts a lens by bonding at a position above the antenna on a surface of the resin package. Patent Literature 3 proposes a configuration mounting a lens in contact with an opening of a tapered slot antenna. Patent Literature 4 proposes a configuration in which a dielectric oscillator is disposed near an end of a plane dielectric line to propagate an electromagnetic wave, an electromagnetic wave is emitted to air by a resonance phenomenon and a lens is arranged with a gap above the oscillator.

CITATION LIST

Patent Literature

Patent Literature 1: Japanese Patent Publication (Kokai) No. 2006-184144A
Patent Literature 2: Japanese Patent Publication (Kokai) No. 2003-315438A
Patent Literature 3: Japanese Patent Publication (Kokai) No. 2000-31727A
Patent Literature 4: Japanese Patent Publication (Kokai) No. 10-341108A(1998)

SUMMARY OF INVENTION

Technical Problem

In Patent Literature 2, however, an inaccurately determined lead frame position in resin-sealing of the MMIC chip easily causes dispersion of spaces between an incident face of the lens and an antenna face among modules, and further, due to an antenna-side end face of the lens in a near field or an area of the near field, an electric field pattern greatly varies depending on a distance. Thus, Patent Literature 2 has a problem that such a minor deviation may cause dispersion of intensity distribution of electromagnetic waves emitted from the radar module via the lens among the modules. Also, Patent Literature 2 has a problem that since the bonded face of the lens is an impedance mismatching face, a transmittance is deteriorated, a problem that since the MMIC chip in the package is bonded, the position of the MMIC chip is unfixed, which may cause dispersion of the position of the antenna axis among the packages, and further, a problem that since an opaque package cannot adjust the positions of the lens axis and the antenna axis, an emission direction of a millimeter wave may deviate from the lens axis. If such radar module in which a lens axis and an antenna axis are deviated is used as a speed measuring device, measurement dispersion occurs among the devices.

Patent Literature 3 has a problem that a length in an emission axis direction of an electromagnetic wave is required, and a problem that determining or fixing a position of the lens is difficult because the lens is necessarily disposed at an almost linear part of an end face of the substrate.

The problems in Patent Literature 4 are as follows. To utilize a resonance phenomenon, the upper and lower faces of the oscillator is required to have a gap for ensuring occurrence of a resonance phenomenon, and thus, the lens is necessarily arranged with a gap. However, to obtain the effect of the lens, whole of the lens is required to be arranged in a remote field considerably apart from a near field area, and thus, a large gap is required. Furthermore, since an electromagnetic wave from the oscillator is emitted at a wide angle, the lens has to be large.

The object of the present invention is to provide a radar module used for, e.g., a speed measuring device, in which dispersion of intensity distribution of electromagnetic waves emitted from the radar modules via a lens is small among the modules.

Solution to Problem

To achieve the aforementioned object, in the present invention, a radar module using a substrate with a plane antenna formed on a surface of the substrate includes: a lens having one end face that is plane and another end face that is spherical, wherein a plane side of the lens is disposed to contact the plane antenna, and a spherical side of the lens is disposed in a remote field of the plane antenna.

Advantageous Effects of Invention

The present invention allows, in a radar module used for, e.g., a speed measuring device, dispersion of intensity distribution of electromagnetic waves emitted via a lens to be small among the modules.

DESCRIPTION OF EMBODIMENTS (Embodiment 1)

Hereinafter, a first embodiment of the present invention will be described with reference to FIG. 1 to FIG. 6. A speed measuring device as an example of the present embodiment uses a radar module utilizing an electromagnetic wave (millimeter wave) of a 77 GHz band.

Figure 1:
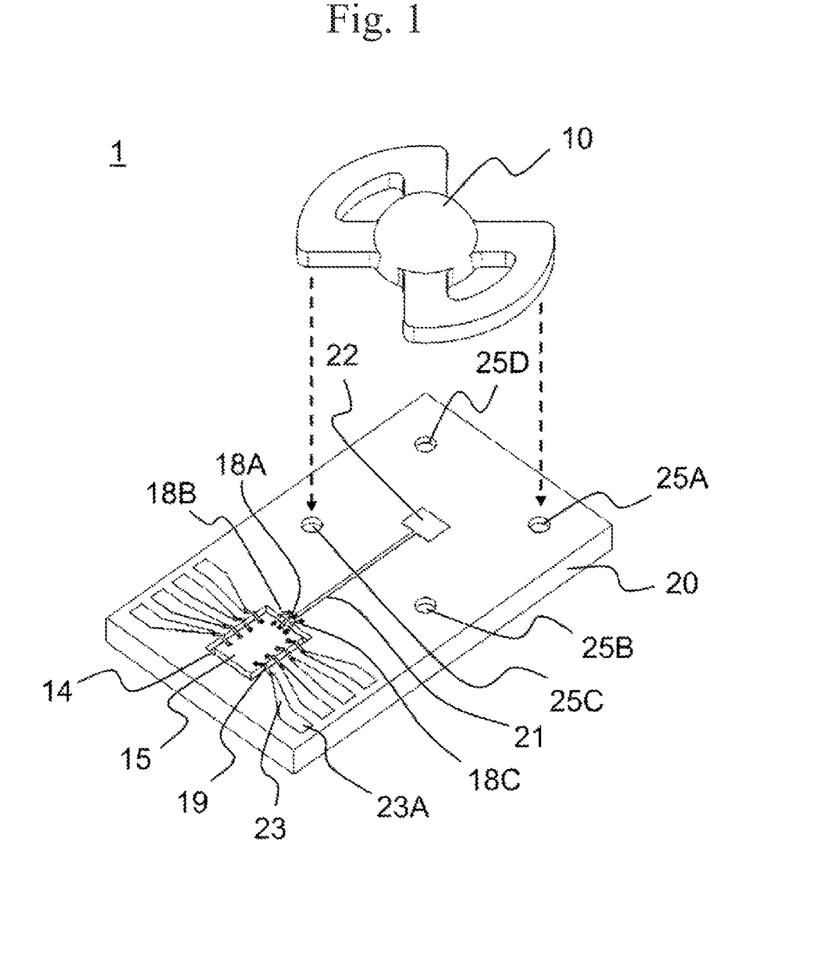
FIG. 1 illustrates an example of a radar module of the present invention.

FIG. 1 is a diagram illustrating an example of a configuration of a millimeter wave radar module 1 as a main part of the speed measuring device. The millimeter wave radar module 1 is mainly formed of a substrate 20, an MMIC chip 15, and a lens 10. In FIG. 1, the lens 10 before fixed on the substrate 20 is illustrated.

On the substrate 20, a plane antenna 22, a feeder 21 and a series of wirings 23 that is used for connection with an outside circuit are formed. Further, on the substrate 20, an IC mount cavity 14 that mounts the MMIC chip 15 by bonding and lens mount cavities 25A to 25D that determine a mount position of the lens 10 are formed. A ceramic multilayer substrate or a printed substrate is used as an example of the substrate 20, a patch antenna as an example of the plane antenna 22, and a microstrip line as an example of the feeder 21. A GND plane parallel to the plane antenna 22 spreads over an inner layer of the substrate 20.

To supply power to the MMIC chip 15 from outside and to input/output a signal between the MMIC chip 15 and the outside, a wire bonding 19 connects the MMIC chip 15 to the series of wirings 23 so that the MMIC chip 15 connects to an outside circuit through a pad portion 23A. A wire bonding 18A connects a millimeter wave band signal terminal of the MMIC chip 15 to the feeder 21 extending from the plane antenna 22. A wire bonding 18B and a wire bonding 18C connect the GND plane on the inner layer of the substrate 20 to a GND terminal of the MMIC chip 15. The connections allow a millimeter wave band transmission signal generated by the MMIC chip 15 to be emitted as an electromagnetic wave into air and allow an electromagnetic wave from air to be received, through the plane antenna 22. (An antenna or a lens can be configured to be same both for transmission and reception, due to its reversibility. In the following descriptions, the antenna is an antenna for transmission, unless noted otherwise.)

Since a directional angle of an electromagnetic wave emitted from the plane antenna 22 is wide, the lens 10 is used to sharpen the directivity by a focusing effect.

Figure 2:
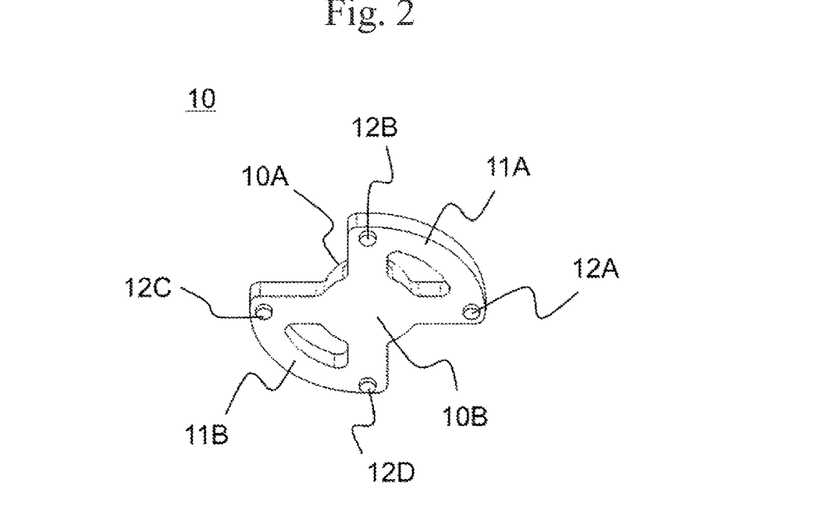
FIG. 2 illustrates an example of a lens of the present invention.

FIG. 2 is a diagram illustrating an example of a structure viewed from the bonded face of the lens 10. Examples of a material of the lens 10 include a resin with a dielectric constant of about 2 to 10. The lens 10 is formed of a curved part 10A and a plane part 10B. The plane part 10B contacts directly with the plane antenna 22.

The lens 10 further includes a flange 11A and a flange 11B that have a structure made of the same material as the lens 10 and elongated integrally. The flange 11A and the flange 11B have positioning bosses 12A to 12D. The positioning bosses 12A to 12D are disposed at the same positions as the aforementioned lens mount cavities 25A to 25D of the substrate 20 in FIG. 1, respectively.

With reference to FIG. 1 again, the lens 10 is fixed to the substrate 20 by bonding between the positioning bosses 12A to 12D and the lens mount cavities 25A to 25D, respectively. When the lens 10 is fixed to the substrate 20, the flanges 11A and 11B do not overlap with the feeder 21.

Figure 3:
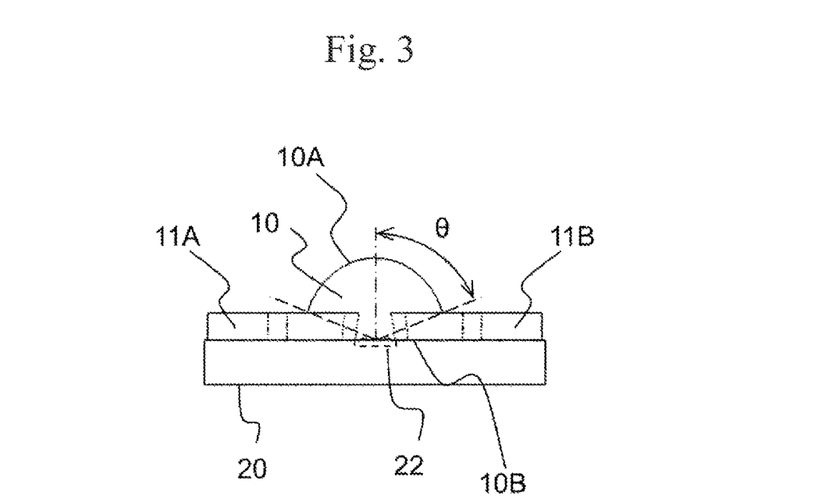
FIG. 3 illustrates an example of a section of the radar module of the present invention.

FIG. 3 is a diagram of the millimeter wave radar module 1 viewed from the side face. The plane part 10B of the lens 10 contacts directly with the plane antenna 22. That is, the plane part 10B is disposed in a near field of the plane antenna 22. In contrast, the curved part 10A is disposed at a position from a center of the plane antenna 22 by about a wavelength of λ or more, i.e., in a remote field of the plane antenna 22. Since the curved part 10A is disposed in the remote field, a space impedance can be considered to be uniform. Thus, even if a distance between the curved part 10A and the plane antenna 22 varies somewhat, dispersion in focusing effect of electromagnetic waves is too small to influence operation of the radar module 1. Furthermore, since the flange 11A and the flange 11B are disposed at respective positions apart from a center axis of the lens 10 by θ or more, an effect that an effect of the lens 10 is not impaired by the flanges 11A and 11B can be provided. Since an emission angle of the plane antenna is about ±45°, θ is preferably 60° or more.

Figure 4:
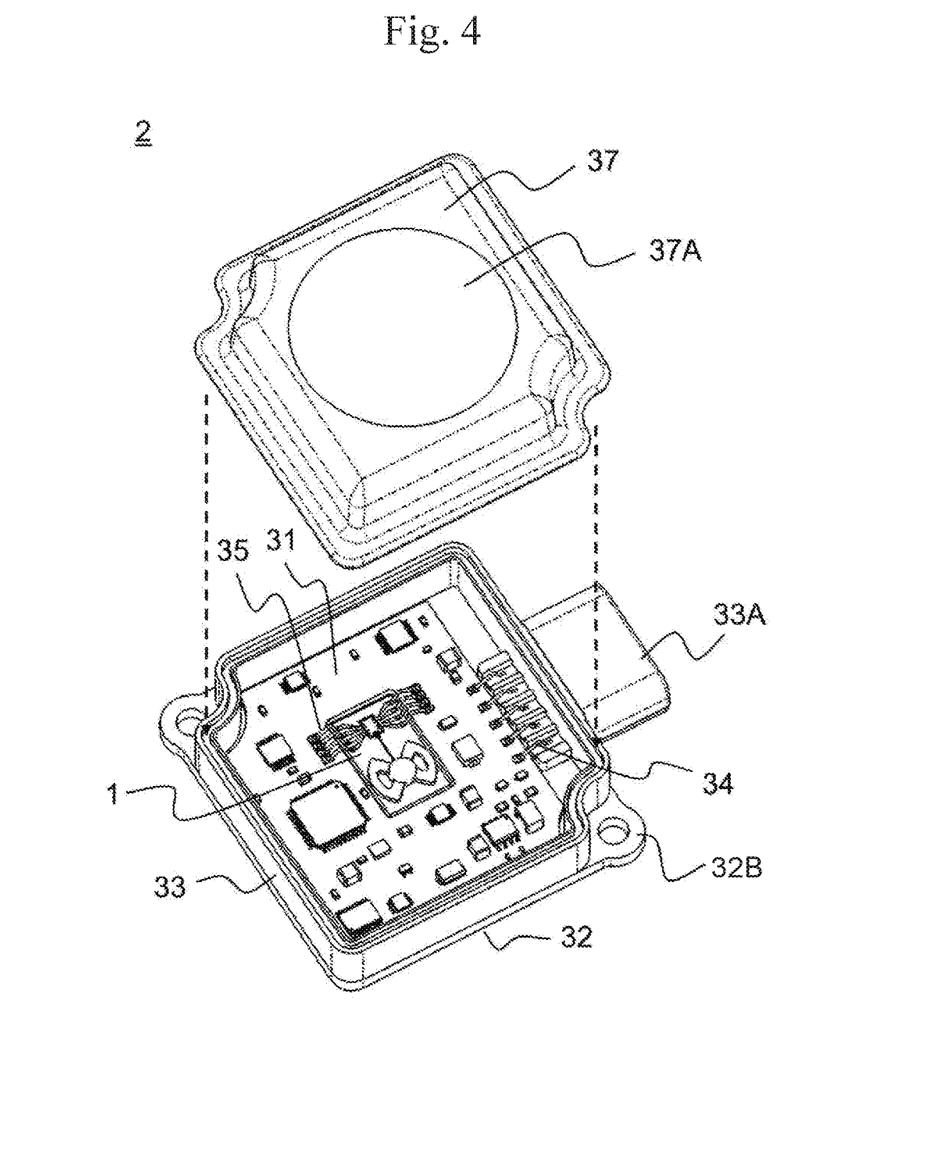
FIG. 4 illustrates an example of a speed measuring device of the present invention.
Figure 5:
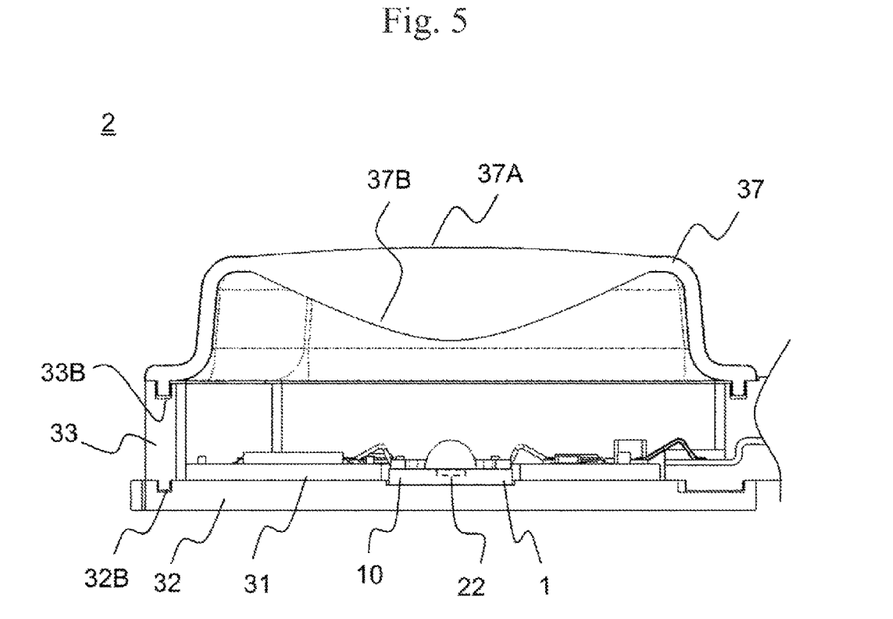
FIG. 5 illustrates an example of a section of the speed measuring device of the present invention.

FIG. 4 and FIG. 5 are a diagram illustrating an example of the configuration of the speed measuring device 2 and a section thereof, respectively. The speed measuring device 2 mainly includes the millimeter wave radar module 1, a peripheral circuit 31, an aluminum base 32, a housing 33 and a cover 37. FIG. 4 illustrates the cover 37 before fixed to the housing 33.

The peripheral circuit 31 mainly has a function to convert a supply voltage from the outside of the speed measuring device 2 to a desired voltage to supply power to the inside of the peripheral circuit 31 and the millimeter wave radar module 1, a function to control the millimeter wave radar module 1 to convert a signal output from the millimeter wave radar module 1 to measured speed information, and a function to output the measured speed information to the outside of the speed measuring device 2.

The aluminum base 32 has a fixing hole to fix the speed measuring device 2 to a transport machine and a function to radiate heat of the speed measuring device 2. The millimeter wave radar module 1, the peripheral circuit 31 and the housing 33 are fixed to the aluminum base 32. The housing 33 includes a connector part 33A used for connection with the outside. The housing 33 is bonded and fixed by fitting in a groove 32B of the aluminum base 32. The wire bonding 34 is used for electrical connection between the peripheral circuit 31 and the connector part 33A.

The cover 37, which includes lens structures 37A and 37B, can sharpen further the directivity of an electromagnetic wave emitted from the lens 10 by a focusing effect. The cover 37 is bonded and fixed by fitting in a groove 33B of the housing 33. Thus, since the millimeter wave radar module 1 and the peripheral circuit 31 are bonded to each of the aluminum base 32, the housing 33 and the cover 37, the millimeter wave radar module 1 and the peripheral circuit 31 can be protected from rainwater or dust.

Figure 6:
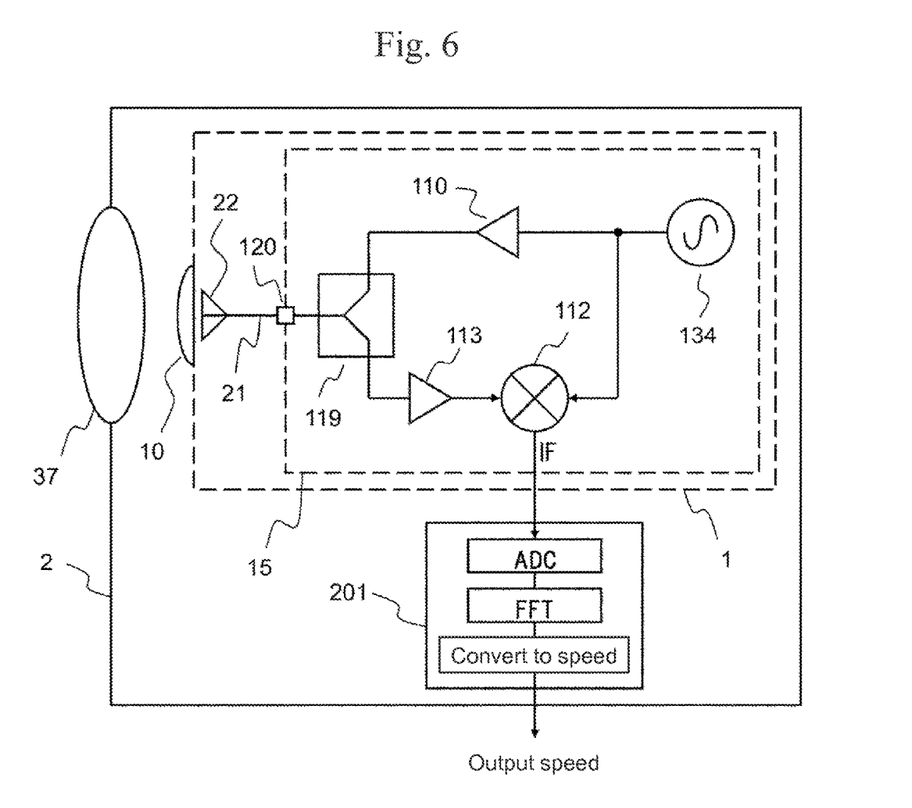
FIG. 6 illustrates a schematic example of a circuit of the speed measuring device.

FIG. 6 is a diagram illustrating an example of a schematic configuration of the circuit of the speed measuring device.

The MMIC chip in the millimeter wave radar module 1 is mainly formed of a oscillator 134, a transmission amplifier 110, an isolator 119, a reception amplifier 113 and a mixer 112. A millimeter wave band signal is transmitted and received at a port 120 connected with the isolator 119. The feeder 21 connects the port 120 to the plane antenna 22, and thus, signal transmission is performed.

Descriptions of operation of the millimeter wave radar module 1 are as follows. A high-frequency signal of 77 GHz band generated by the oscillator 134 is amplified by the transmission amplifier 110, and subsequently, is propagated to the plane antenna 22 through the isolator 119, and emitted to air as an electromagnetic wave by the plane antenna 22. The emitted electromagnetic wave is focused by the lens 10 and the cover 37 having the lens function to be incident on the ground. The millimeter wave is reflected by the ground. The frequency of the reflected wave changes by the Doppler effect in proportion to a groundspeed. The electromagnetic wave reflected by the ground is incident on the plane antenna 22 via the cover 37 and the lens 10. A signal received by the plane antenna 22 is propagated to the reception amplifier 113 by the isolator 119. The signal is amplified by the reception amplifier 113, and mixed with a high-frequency signal output from the oscillator 134 at the mixer 112 to generate an IF (intermediate frequency) signal. The IF signal is input into an operation circuit 201. The frequency of the IF signal is an absolute value of the frequency change by the Doppler effect. Main operations of the operation circuit 201 are to convert the IF signal into a digital signal with an AD converter, to obtain the frequency of the IF signal by FFT (fast Fourier transform) processing of the digital signal, and to convert the frequency to a speed v. If an angle between an incident direction of the millimeter wave to the ground and a direction opposite to a speed vector is θ, the speed v is expressed by the following equation:

$$v = (c/2f_0 |\cos \theta|) \times f_d, \quad \text{(Equation 1)}$$

wherein c is a light velocity, $f_0$ is a frequency of a signal output by the oscillator, and $f_d$ is a frequency change quantity by the Doppler effect.

The aforementioned configuration can provide the following effects.

(1) Since the position relationship of the plane antenna 22 and the lens 10 is accurately adjusted, dispersion of the emission direction of an electromagnetic wave can be made small among the modules. (2) Since the gap between the plane antenna 22 and the lens 10 is made zero, dispersion of the intensity of an electromagnetic wave emitted via the lens can be made small among the modules, and further, an electromagnetic wave emitted from the plane antenna can be incident on the lens 10 effectively. (3) Since the distance between the plane antenna 22 and the lens 10 is a minimum, the size of the lens 10 can be made small. Thus, the length of the radar module 1 in an emission axis direction of the electromagnetic wave can be made small, and further, even if an expensive material having an excellent property is used, the impact on the cost is small.

(4) The two separate flanges do not overlap directly with the feeder, which causes no influence on power supply to the plane antenna 22. (5) A resin molding technique enables simultaneous forming of the lens 10, the flanges 11A and 11B, the positioning bosses 12A to 12D. This takes a low cost for the processing. (6) If the resin is molded by injection molding, a gate can be placed at the flange 11A or the flange 11B, and distortion during the molding, which may influence on the focusing property of the lens 10, can be suppressed.

(7) Since the curved part 10A of the lens 10 is disposed in the remote field of the plane antenna 22, the focusing effect of the curved part 10A can be easily obtained. (8) The flanges 11A and 11B do not prevent an effect of the lens.

(Embodiment 2)

Next, a second embodiment of the present invention will be described with reference with FIG. 7.

Figure 7:
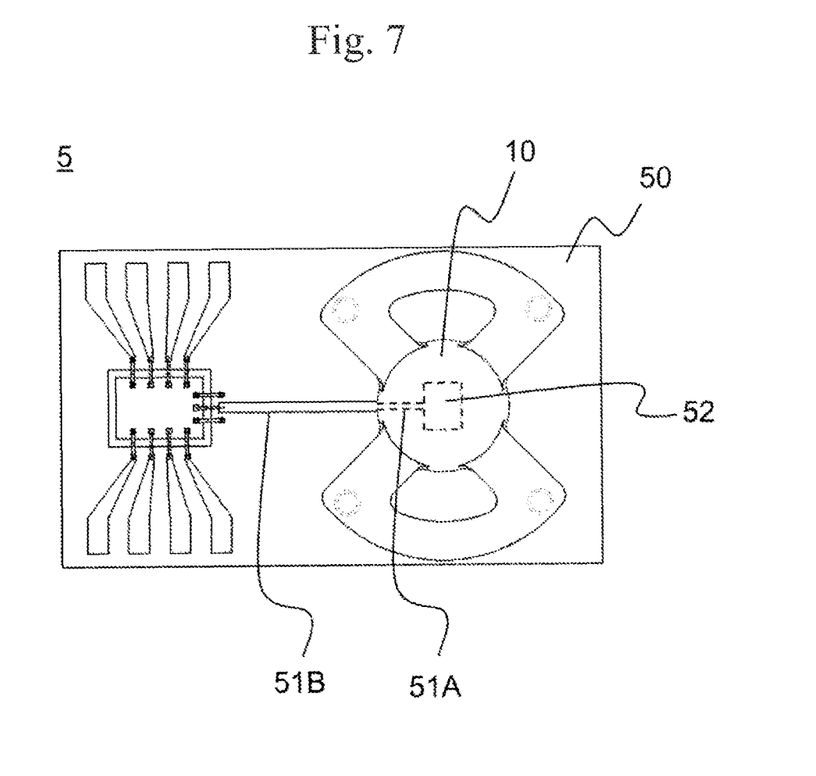
FIG. 7 illustrates an example of the radar module of the present invention.

In the configuration of a millimeter wave radar module 5 in FIG. 7, feeders to a plane antenna 52 in a substrate 50 are feeders 51A and 51B having different widths. A connection interface between the feeder 51A and the feeder 51B is disposed at a same position as the border of the lens 10.

Although change of an impedance of the feeders is caused by change of a dielectric constant on upper faces of the feeders due to addition of the lens 10, the present configuration allows such change of the impedance to be small.

(Embodiment 3)

Next, a third embodiment of the present invention will be described with reference to FIG. 8.

Figure 8:
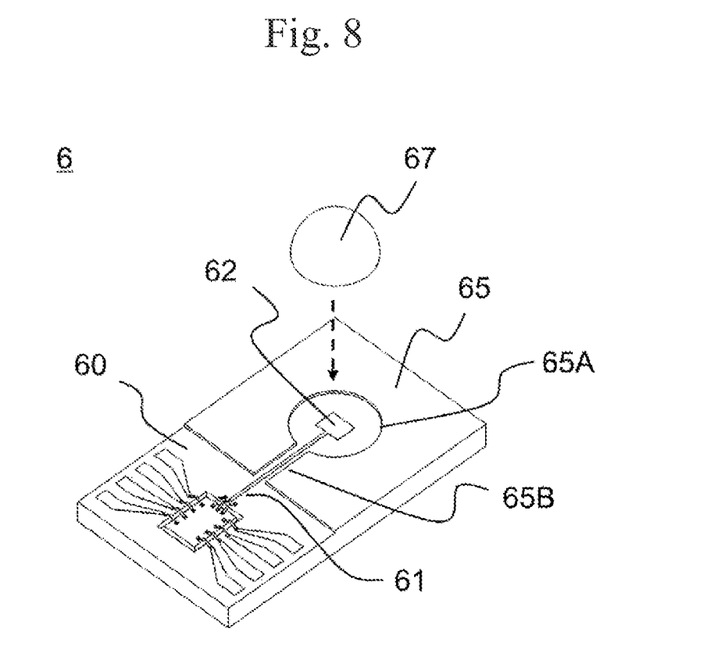
FIG. 8 illustrates an example of the radar module of the present invention.

In the configuration of a millimeter wave radar module 6 in FIG. 8, a stepped structure 65 is provided in a substrate 60. In the stepped structure 65, a cavity structure 65A surrounds a plane antenna 62. The size of the cavity structure 65A is same as the periphery of a lens 67. A groove 65B is further provided to prevent the stepped structure 65 from overlapping with a feeder 61. The lens 67 is fitted in the cavity structure 65A and bonded. The bonded part preferably corresponds to the periphery of the lens 67.

The present configuration makes positioning of the lens 67 easy.

(Embodiment 4)

Next, a fourth embodiment of the present invention will be described with reference to FIG. 9 and FIG. 10.

Figure 9:
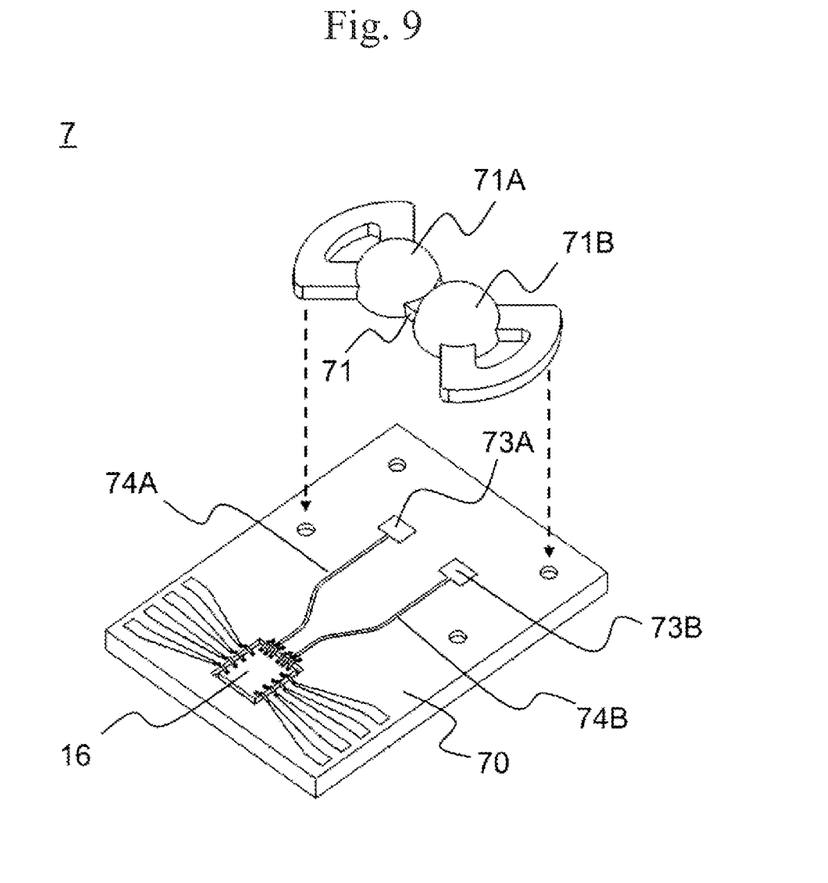
FIG. 9 illustrates an example of the radar module of the present invention.

In the configuration of a millimeter wave radar module 7 in FIG. 9, on a substrate 70, two plane antennas 73A and 73B and feeders 74A and 74B connected to the plane antennas 73A and 73B, respectively, are formed. The feeders 74A and 74B are connected to a millimeter wave band signal terminal of an MMIC chip 16 bonded to the substrate 70. A lens array 71 having two lens structures 71A and 71B is bonded to the substrate 70.

Figure 10:
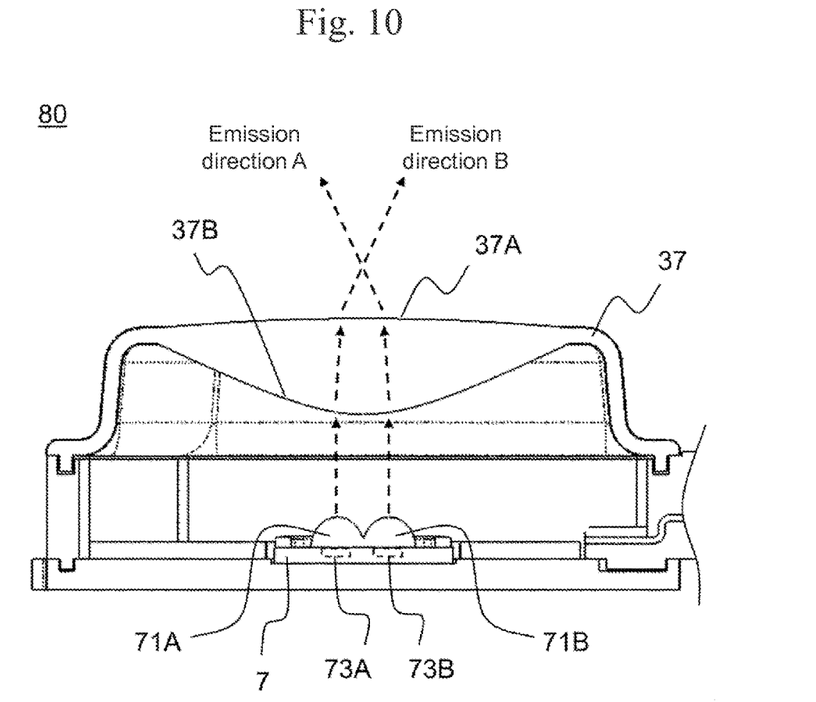
FIG. 10 illustrates an example of a section of the speed measuring device of the present invention.

FIG. 10 is a section of a speed measuring device 80. Electromagnetic waves emitted from the plane antennas 73A and 73B of the millimeter wave radar module 7 are incident on the lens structures 71A and 71B, respectively, and focused. The electromagnetic waves emitted from the lens structures 71A and 71B are emitted toward emission directions A and B, by the lens structure parts 37A and 37B of the cover 37, respectively. Although two sets of an antenna and a lens are described herein, the number of the sets may be three or more.

The aforementioned configuration allows a single substrate to emit millimeter waves in multiple directions accurately.

In the above descriptions, a speed measuring device is an example. The present invention can be applied also to a general radar that modulates an electromagnetic wave to measure a distance from an object and a relative speed simultaneously.

REFERENCE SIGNS LIST 1, 5, 6 Millimeter wave radar module
2, 80 Speed measuring device
10, 67 Lens
11A, 11B
12A, 12B, 12C, 12D 15, 16 MMIC chip
20, 50, 60, 70 Substrate
21, 51A, 51B, 74A, 74B Feeder
22, 52, 62 Plane antenna
25A, 25B, 25C, 25D Lens mount cavity
31 Peripheral circuit
32 Aluminum base
33 Housing
37 Cover
65 Stepped structure
71 Lens array

The invention claimed is:

1. A radar module using a substrate with a plane antenna formed on a surface of the substrate, the radar module comprising:
   the substrate; and
   a lens having one end face that is plane and another end face that is spherical, wherein
   a plane side of the lens is disposed to contact the plane antenna,
   a spherical side of the lens is disposed in a remote field of the plane antenna,
   a feeder connected to the plane antenna is formed on the substrate, and
   a width of the feeder changes at an interface between the substrate and the lens as a boundary.

2. The radar module according to claim 1, wherein the lens has a flange made of a same material as the lens, the flange elongating integrally with the lens.

3. The radar module according to claim 2, wherein the flange has a notch part having a part cut, and the feeder connected to the plane antenna is disposed in an area of the notch part.

4. The radar module according to claim 2, wherein the flange has a positioning boss on the plane side of the lens, and the substrate has a positioning cavity at a same position as the positioning boss.

5. The radar module according to claim 2, wherein the flange is formed in an area of an angle of 60 degrees or more with respect to a center axis of the lens.

6. The radar module according to claim 1, wherein the substrate has a stepped structure formed of a cavity structure having a size substantially same as a periphery of the lens, and the cavity structure surrounds the plane antenna.

7. The radar module according to claim 6, wherein the stepped structure further has a groove in which at least part of the feeder connected to the plane antenna is disposed.

8. The radar module according to claim 1, further comprising:
   one or more additional plane antennas provided on the surface of the substrate, wherein
   the lens includes the same number of lens structures as a total number of the plane antennas,
   each of the lens structures is disposed on the substrate in a manner corresponding to the respective plane antenna, and
   the lens structures are formed integrally.

9. A speed measuring device comprising:
   a radar module according to claim 1; and
   a circuit configured to measure a speed based on an electromagnetic wave emitted from the radar module.

10. The speed measuring device according to claim 9, wherein the radar module further comprises a second lens that is provided above a face on which the lens of the radar module is mounted.

11. A radar module using a substrate with a plane antenna formed on a surface of the substrate, the radar module comprising:
   the substrate; and
   a lens having one end face that is plane and another end face that is spherical, wherein
   a plane side of the lens is disposed to contact the plane antenna,
   a spherical side of the lens is disposed in a remote field of the plane antenna,
   the substrate has a stepped structure formed of a cavity structure having a size substantially same as a periphery of the lens, and the cavity structure surrounds the plane antenna, and
   the stepped structure further has a groove in which at least part of a feeder connected to the plane antenna is disposed.

* * * * *